(12) United States Patent
Uchino et al.

(10) Patent No.: US 10,383,149 B2
(45) Date of Patent: Aug. 13, 2019

(54) USER EQUIPMENT AND METHOD

(71) Applicant: NTT DOCOMO, INC., Tokyo (JP)

(72) Inventors: Tooru Uchino, Tokyo (JP); Wuri Andarmawanti Hapsari, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 38 days.

(21) Appl. No.: 15/308,778

(22) PCT Filed: Mar. 25, 2015

(86) PCT No.: PCT/JP2015/059068
§ 371 (c)(1),
(2) Date: Nov. 3, 2016

(87) PCT Pub. No.: WO2015/170523
PCT Pub. Date: Nov. 12, 2015

(65) Prior Publication Data
US 2017/0188392 A1    Jun. 29, 2017

(30) Foreign Application Priority Data
May 9, 2014    (JP) ................................. 2014-098136

(51) Int. Cl.
*H04W 74/08*    (2009.01)
*H04W 74/00*    (2009.01)
(Continued)

(52) U.S. Cl.
CPC ......... *H04W 74/0833* (2013.01); *H04W 4/50* (2018.02); *H04W 36/36* (2013.01);
(Continued)

(58) Field of Classification Search
None
See application file for complete search history.

(56) References Cited

U.S. PATENT DOCUMENTS

2007/0142070 A1* 6/2007 Soldani .................... H04L 1/18
455/515
2015/0003354 A1* 1/2015 Uchino ................. H04W 52/34
370/329
(Continued)

FOREIGN PATENT DOCUMENTS

EP    3100557 A1    12/2016
EP    3136809 A1    3/2017
(Continued)

OTHER PUBLICATIONS

International Search Report issued in corresponding Application No. PCT/JP2015/059068 dated Jun. 30, 2015 (2 pages).
(Continued)

*Primary Examiner* — David Bilodeau
(74) *Attorney, Agent, or Firm* — Osha Liang LLP (57) ABSTRACT

Techniques for allowing a base station indicating reconfiguration for user equipment to detect whether an RA procedure performed in response to the reconfiguration indication is successful or unsuccessful. A user equipment with dual connectivity functionality communicates with a master base station and a secondary base station simultaneously, and includes a transmission and reception unit that transmits and receives radio signals to/from the master and secondary base stations; an RA processing unit that performs a random access (RA) procedure; and a timer management unit that activates a timer upon detecting an RA procedure activation event for triggering activation of the RA procedure for the secondary base station. If the RA procedure performed in response to detection of the RA procedure activation event has not been completed before expiration of the timer, the timer management unit indicates that the triggering base station that the RA procedure has not been completed.

16 Claims, 5 Drawing Sheets

(51) Int. Cl.
H04W 48/20 (2009.01)
H04W 36/36 (2009.01)
H04W 76/19 (2018.01)
H04W 76/15 (2018.01)
H04W 4/50 (2018.01)

(52) U.S. Cl.
CPC ......... *H04W 48/20* (2013.01); *H04W 74/004* (2013.01); *H04W 76/15* (2018.02); *H04W 76/19* (2018.02); *H04W 74/008* (2013.01)

(56) References Cited

U.S. PATENT DOCUMENTS

| | | | | |
|---|---|---|---|---|
| 2015/0173047 | A1* | 6/2015 | Yamada | H04W 72/042 370/329 |
| 2015/0215826 | A1* | 7/2015 | Yamada | H04W 36/0072 455/436 |
| 2015/0223233 | A1 | 8/2015 | Seo et al. | |
| 2016/0323873 | A1* | 11/2016 | Takeda | H04L 5/001 |
| 2017/0006641 | A1* | 1/2017 | Dinan | H04W 74/0833 |
| 2017/0019930 | A1* | 1/2017 | Lee | H04W 74/0833 |

FOREIGN PATENT DOCUMENTS

| | | |
|---|---|---|
| JP | 2009-201114 A | 9/2009 |
| WO | 2014/035135 A1 | 3/2014 |
| WO | 2015115033 A1 | 8/2015 |

OTHER PUBLICATIONS

Written Opinion of the International Searching Authority issued in corresponding Application No. PCT/JP2015/059068 dated Jun. 30, 2015 (4 pages).
Ericsson, "Introduction of Dual Connectivity (RAN3 input for Overall Signalling Diagrams)"; 3GPP TSG-RAN WG2 #85bis, R2-141860; Valencia, Spain; Mar. 31-Apr. 4, 2014 (15 pages).
Japanese Office Action of Japanese Application No. 2014-098136 dated Jun. 30, 2015 (5 pages).
Japanese Office Action of Japanese Application No. 2014-098136 dated Feb. 16, 2016 (6 pages).
Japanese Office Action of Japanese Application No. 2014-098136 dated Sep. 27, 2016 (6 pages).
NSN, Nokia Corporation, "RA and RRC Reconfiguration for SCG addition/modification"; 3GPP TSG-RAN WG2 Meeting #85bis, R2-141611; Valencia, Spain; Mar. 31-Apr. 4, 2014 (4 pages).
Office Action issued in corresponding Japanese Patent Application No. 2014-098136, dated Jan. 23, 2018 (39 pages).
ETSI MCC, "Report of 3GPP TSG RAN WG2 meeting #85, Prague, Czech Republic, Feb. 10-14, 2013", 3GPP TSG-RAN Working Group 2 meeting #85bis, R2-141854, Valencia, Spain, Mar. 31-Apr. 4, 2014 (155 pages).
ITRI, "Further Discussion on RLF Handling in Dual Connectivity", 3GPP TSG-RAN WG2 Meeting #85bis, R2-141345, Valencia, Spain, Mar. 31-Apr. 4, 2014 (3 pages).
Extended European Search Report issued in the counterpart European Patent Application No. 15789115.1, dated Apr. 12, 2017 (11 pages).
NSN, et al.; "RRC Reconfiguration procedure for Dual Connectivity"; 3GPP TSG-RAN WG2 Meeting #85, R2-140375; Prague, Czech Republic, Feb. 10-14, 2014 (5 pages).
RAN3 (Ericsson); "Introduction to Dual Connectivity (RAN 3 input for Overall Signalling Diagrams)"; 3GPP TSG-RAN WG2 #85bis, R2-141860; Valencia, Spain, Mar. 31-Apr. 4, 2014 (15 pages).
Office Action issued in the counterpart European Application No. 15789115.1, dated May 8, 2018 (7 pages).
Office Action issued in corresponding Russian Application No. 2016146791, dated Jan. 26, 2018 (10 pages).
Sharp; "Signalling flow of SeNB reconfiguration procedure"; 3GPP TSG-RAN WG2#84, R2-134235; San Francisco, USA; Nov. 11-15, 2013 (4 pages).
Intel Corporation; "Radio link failure handling for dual connectivity"; 3GPP TSG RAN WG2 Meeting #85, R2-140828; Prague, Czech Republic; Feb. 10-14, 2014 (4 pages).
Office Action issued in the counterpart Chinese Patent Application No. 201580025688.1, dated Mar. 18, 2019 (16 pages).

* cited by examiner

USER EQUIPMENT AND METHOD

TECHNICAL FIELD

The present invention relates to a radio communication system.

BACKGROUND ART

Presently, as a next-generation communication standard of LTE (Long Term Evolution) systems, specifications of LTE-Advanced are being developed. In LTE-Advanced systems, carrier aggregation (CA) technique is introduced to achieve a higher throughput than that of the LTE systems while ensuring backward compatibility with the LTE systems. In the carrier aggregation, a component carrier (CC) having the maximum bandwidth of 20 MHz supported by the LTE systems is used as a basic component, and it is designed to achieve communication in a broader band by using these multiple component carriers simultaneously.

In the carrier aggregation, user equipment (UE) can use multiple carrier components simultaneously to communicate with a base station (evolved NodeB: eNB).

In the carrier aggregation, a highly reliable primary cell (PCell) to ensure connectivity to the user equipment and a secondary cell (SCell) additionally configured for the user equipment during connection to the primary cell are configured.

The primary cell is similar to a serving cell in the LTE systems and serves as a cell to ensure connectivity between the user equipment and a network. On the other hand, the secondary cell is a cell configured for the user equipment additionally to the primary cell.

Figure 1:
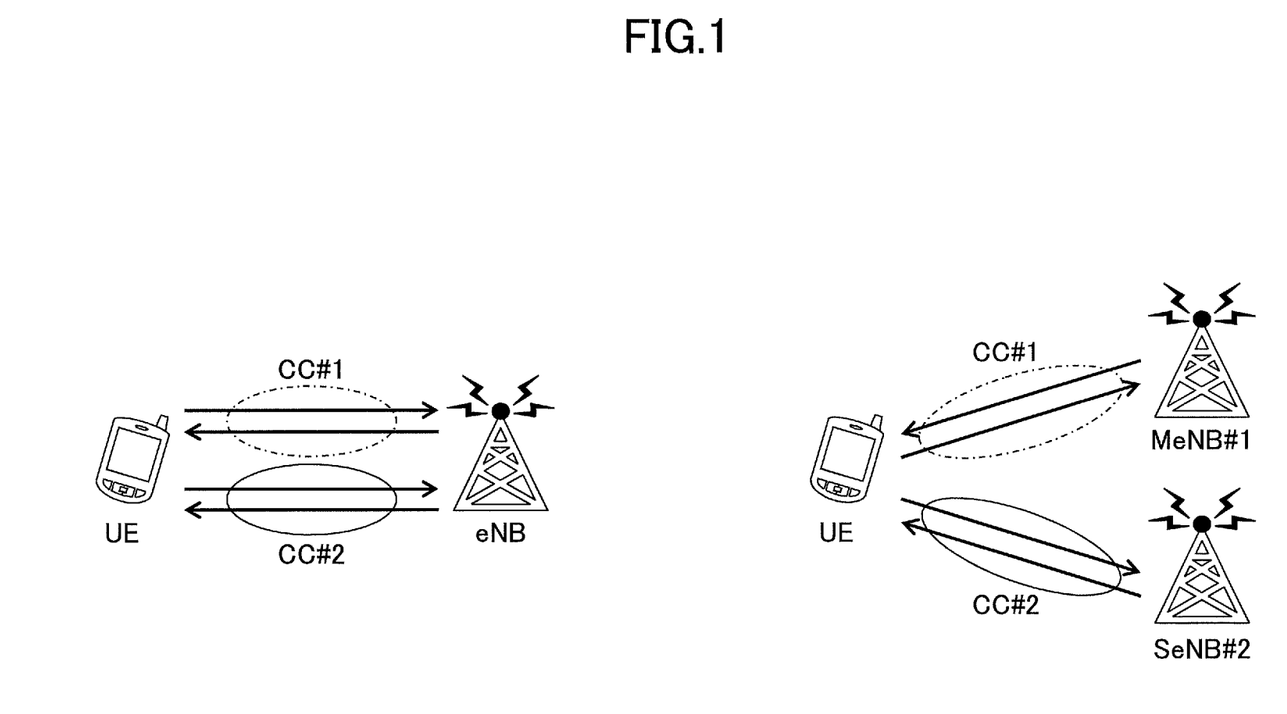
FIG. 1 is a schematic view for illustrating carrier aggregation.

In the carrier aggregation up to LTE Release 10 (Rel-10), as illustrated in the left side in FIG. 1, it is defined that user equipment uses multiple component carriers served from a single base station to conduct simultaneous communication. Meanwhile, in Rel-12, the carrier aggregation in Rel-10 is further extended, and as illustrated in the right side in FIG. 1, dual connectivity (DC) where the user equipment uses multiple component carriers served from multiple base stations to conduct the simultaneous communication is discussed. For example, if all component carriers cannot be accommodated in a single base station, it is considered that the dual connectivity can be effectively utilized to achieve a throughput nearly equal to that in Rel-10.

Figure 2:
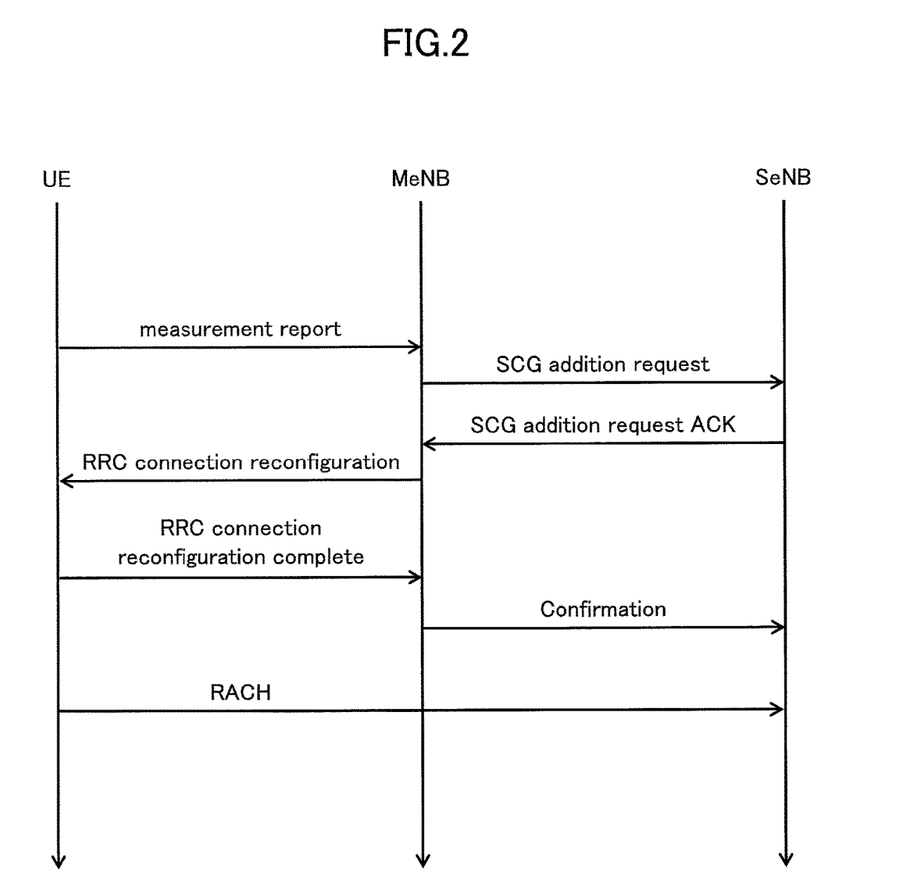
FIG. 2 is a sequence diagram for illustrating conventional operations to configure a secondary cell in dual connectivity.

In the dual connectivity, in accordance with a process sequence as illustrated in FIG. 2, a master base station (MeNB) adds a secondary cell or a secondary cell group served by a secondary base station (SeNB) to the user equipment. As illustrated in FIG. 2, the master base station receives a measurement report indicative of an inter-frequency measurement result from the user equipment. Upon determining to additionally configure a secondary cell for the user equipment based on the received measurement report, the master base station transmits a SCG addition request to the secondary base station. Upon receiving the SCG addition request, the secondary base station returns a SCG addition request ACK including a configuration of the secondary base station. Upon receiving the SCG addition request ACK, the master base station transmits an RRC connection reconfiguration to the user equipment to additionally configure the secondary cell for the user equipment. Upon receiving the RRC connection reconfiguration, the user equipment reconfigures the configuration in accordance with the received RRC connection reconfiguration and returns an RRC connection reconfiguration complete indicative of completion of the reconfiguration to the master base station. Upon receiving the RRC connection reconfiguration complete, the master base station transmits a confirmation to the secondary base station to indicate that the user equipment has been reconfigured. On the other hand, upon receiving an RRC connection reconfiguration to indicate that a secondary cell should be additionally configured, the user equipment performs a random access (RA) procedure for the secondary base station to establishment uplink timing with the secondary base station.

See R2-141860 for further details, for example.

SUMMARY OF INVENTION

Problem to be Solved by the Invention

As stated above, in the additional configuration of the secondary cell, the user equipment returns an RRC connection reconfiguration complete to the master base station before completion of the RA procedure for the secondary base station. Accordingly, the master base station cannot confirm whether the user equipment has actually established connection to the secondary base station. In other words, the master base station cannot detect whether the RA procedure has been successful or unsuccessful. In this manner, if it cannot be detected whether the RA procedure has been successful or unsuccessful, the user equipment cannot transmit uplink data in a bearer configured for the secondary cell, which cannot improve throughput. Also from standpoint of a network, unnecessary configuration remains enabled, which cannot use network resources efficiently.

In light of the above-stated problem, an object of the present invention is to provide techniques for allowing the base station indicating reconfiguration to the user equipment to detect whether the RA procedure performed in response to the reconfiguration indication has been successful or unsuccessful.

Means for Solving the Problem

In order to achieve the above object, one aspect of the present invention relates to user equipment having a dual connectivity function to communicate with a master base station and a secondary base station simultaneously, comprising: a transmission and reception unit configured to transmit and receive radio signals to/from the master base station and the secondary base station; an RA processing unit configured to perform a random access (RA) procedure; and a timer management unit configured to activate a timer upon detecting an RA procedure activation event for triggering activation of the RA procedure for the secondary base station, wherein if the RA procedure performed in response to detection of the RA procedure activation event has not been completed before expiration of the timer, the timer management unit indicates to the triggering base station that the RA procedure has not been completed.

Another aspect of the present invention relates to a method for performing a random access (RA) procedure in user equipment having a dual connectivity function to communicate with a master base station and a secondary base station simultaneously, comprising: detecting an RA procedure activation event to trigger activation of the RA procedure for the secondary base station; performing the RA procedure and activating a timer; and if the performed RA procedure has not been completed before expiration of the timer, indicating incompletion of the RA procedure to the triggering base station.

Advantage of the Invention

According to the present invention, the base station indicating reconfiguration to the user equipment can detect whether the RA procedure performed in response to the reconfiguration indication has been successful or unsuccessful.

EMBODIMENTS OF THE INVENTION

Embodiments of the present invention are described below with reference to the drawings.

In embodiments as stated below, user equipment having a dual connectivity function to communicate with a master base station and a secondary base station simultaneously is disclosed. Summarizing the embodiments below, when an operation required to perform a random access (RA) procedure for the secondary base station such as additional configuration of a secondary cell is indicated, the user equipment performs the RA procedure and activates a timer. If the RA procedure has not been completed before expiration of the timer, the user equipment indicates incompletion of the RA procedure to the master base station.

Figure 3:
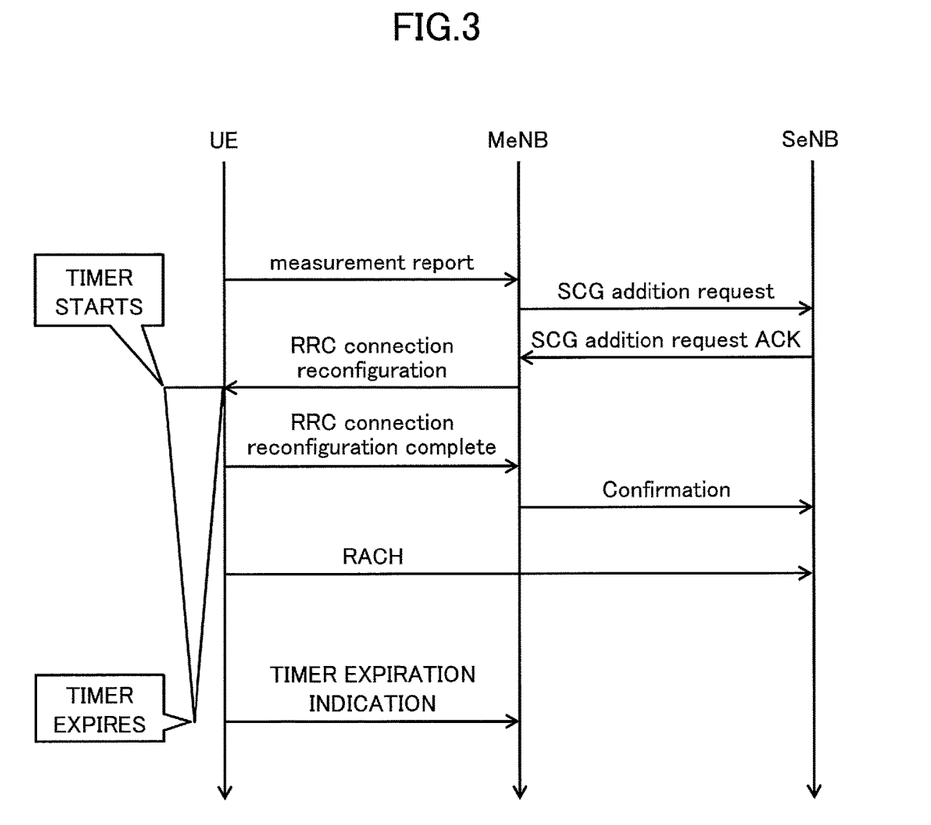
FIG. 3 is a sequence diagram for illustrating operations to configure a secondary cell in the dual connectivity according to one embodiment of the present invention.

For example, as illustrated in FIG. 3, upon receiving an RRC connection reconfiguration from the master base station to indicate additional configuration of a secondary cell for the user equipment, the user equipment performs the RA procedure for the secondary base station and activates the timer. If the RA procedure has not been successful until expiration of the timer, the user equipment transmits a timer expiration indication to the master base station. Upon receiving the timer expiration indication, the master base station can detect that no connection has been established between the user equipment and the secondary base station and determine that dual connectivity communication using the secondary base station is unavailable.

Figure 4:
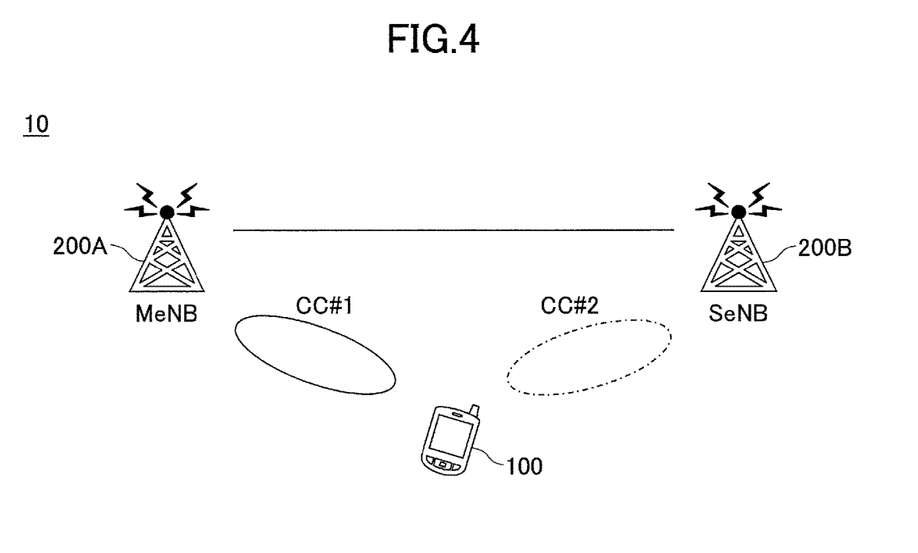
FIG. 4 is a schematic view for illustrating a radio communication system according to one embodiment of the present invention.

A radio communication system according to one embodiment of the present invention is described with reference to FIG. 4. FIG. 4 is a schematic view for illustrating a radio communication system according to one embodiment of the present invention.

As illustrated in FIG. 4, a radio communication system 10 has user equipment 100 and base stations 200A, 200B. The radio communication system 10 supports dual connectivity where the user equipment 100 uses component carriers CC#1, CC#2 served from the multiple base stations 200A, 200B to conduct simultaneous communication, and as illustrated, the user equipment 100 uses a dual connectivity function to communicate with the master base station (MeNB) 200A and the secondary base station (SeNB) 200B. In the illustrated embodiment, only the two base stations 200A, 200B are illustrated, but a large number of base stations 200 are generally disposed to cover a service area of the radio communication system 10.

The user equipment 100 has the dual connectivity function to communicate with the multiple base stations 200A, 200B simultaneously. Typically, as illustrated, the user equipment 100 may be any appropriate information processing device with a radio communication function such as a smartphone, a mobile phone, a tablet and a mobile router. The user equipment 100 is arranged from. a CPU (Central Processing Unit) such as a processor, a memory device such as a RAM (Random Access Memory) and a flash memory, a radio communication device for transmitting and receiving radio signals to/from the base stations 200A, 200B and so on. For example, functions and operations of the user equipment 100 as stated below may be implemented by the CPU running data and programs stored in the memory device. However, the user equipment 100 is not limited to the above-stated hardware configuration and may be arranged from circuits for implementing one or more of operations as stated below.

The base stations 200A, 200B (which may be collectively referred to as the base stations 200 hereinafter) establish a radio connection to the user equipment 100 to transmit downlink (DL) packets received from network devices, such as an upper station and a server, communicatively connected on a core network (not shown) to the user equipment 100 as well as transmit uplink (UL) packets received from the user equipment 100 to the network devices. In the illustrated embodiment, the base station 200A serves as a master base station (MeNB) or a primary base station, and the base station 200B serves as a secondary base station (SeNB). In the dual connectivity, the master base station 200A controls simultaneous communication between the user equipment 100 and the base stations 200A, 200B in accordance with the dual connectivity and controls communication with the upper core network (not shown).

Figure 5:
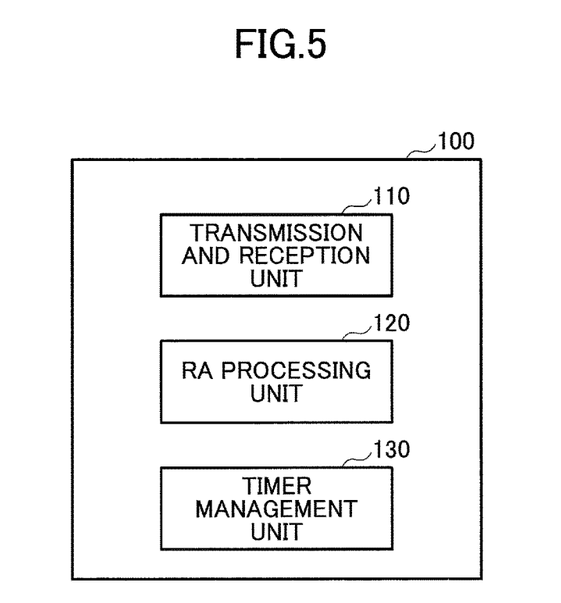
FIG. 5 is a block diagram for illustrating an arrangement of user equipment according to one embodiment of the present invention.

Next, an arrangement of the user equipment according to one embodiment of the present invention is described with reference to FIG. 5. The user equipment according to this embodiment has the dual connectivity function to communicate with the master base station 200A and the secondary base station 200B simultaneously. FIG. 5 is a block diagram for illustrating an arrangement of the user equipment according to one embodiment of the present invention.

As illustrated in FIG. 5, the user equipment 100 has a transmission and reception unit 110, a random access (RA) processing unit 120 and a timer management unit 130.

The transmission and reception unit 110 transmits and receives radio signals to/from the master base station 200A and the secondary base station 200B. Specifically, the transmission and reception unit 110 transmits and receives various radio signals such as uplink/downlink control channels and/or uplink/downlink data channels to/from the master base station 200A and the secondary base station 200B. Also, if the dual connectivity is configured, the transmission and reception unit 110 can communicate with the master base station 200A and the secondary base station 200B simultaneously.

The RA processing unit 120 performs a random access (RA) procedure. In one embodiment, in response to detection of an RA procedure activation event for triggering activation of the RA procedure for the secondary base station 200B, the RA processing unit 120 activates the RA procedure for the secondary base station 200B. The RA procedure activation event may be various indications such as additional configuration of a secondary cell, modification of a special secondary cell (primary secondary cell) for which a PUCCH (Physical Uplink Control Channel) is configured, modification of security of a secondary cell, switching on and off TTI (Transmission Timer Interval) bundling in a secondary cell (if supported) or the like, for example. Also, the RA processing unit 120 can perform the RA procedure in accordance with any of a contention type of RA procedure or a non-contention type of RA procedure. Typically, the contention type of RA procedure is the RA procedure autonomously activated by the user equipment 100, and the non-contention type of RA procedure is the RA procedure activated by indications from the base station 200.

For example, upon receiving an RRC connection reconfiguration from the master base station 200A to indicate additional configuration of a secondary cell, the RA processing unit 120 performs the RA procedure for the secondary base station 200B, reconfigures the user equipment 100 in accordance with the RRC connection reconfiguration and then returns an RRC connection reconfiguration complete to the master base station 200A. As stated above in conjunction with FIG. 3, the RA processing unit 120 transmits the RRC connection reconfiguration complete to the master base station 200A without waiting for completion of the RA procedure.

The timer management unit 130 activates a timer upon detecting an RA procedure activation event for triggering activation of the RA procedure for the secondary base station 200B. Then, if the RA procedure performed in response to detection of the RA procedure activation event has not been completed before expiration of the timer, the timer management unit 130 indicates to the triggering base station that the RA procedure has not been completed. The triggering base station 200 is typically the master base station 200A, but is not limited to it, and may be the primary secondary base station 200B to serve a primary secondary cell where a PUCCH is configured, for example.

On the other hand, if the RA procedure has been completed before expiration of the timer, the timer management unit 130 stops and resets the timer. In one embodiment, in response to reception of an RA response, completion of a contention resolution or reception of an initial PDCCH (Physical Downlink Control Channel), the timer management unit 130 may determine that the RA procedure has been completed. For example, if the RA procedure is the non-contention type of RA procedure, in response to reception of an RA response as message 2, the timer management unit 130 may determine that the RA procedure has been completed. Also, if the RA procedure is the contention type of RA procedure, in response to reception of a contention resolution as message 4, the timer management unit 130 may determine that the RA procedure has been completed. Furthermore, in response to reception of an initial PDCCH after establishment of connection to the secondary base station 200B, the timer management unit 130 may determine that the RA procedure has been completed. The PDCCH may be any PDCCH for a DL assignment (including new transmission and retransmission), an UL grant (including new transmission and retransmission), a DL assignment (targeted for only new transmission), an UL grant (targeted for only new transmission) and an aperiodic CQI/SRS request.

The timer may be set to any appropriate period where it can be determined whether the RA procedure is successful or unsuccessful. For example, if the timer is set to a too short period compared to the period where it can be determined whether the RA procedure has been successful or unsuccessful, the timer would expire during execution of the RA procedure, and an incompletion indication of the RA procedure would be transmitted to the triggering base station 200 before determining whether the RA procedure has been successful or unsuccessful. On the other hand, if the timer is set to a too long period compared to the period where it can be determined whether the RA procedure has been successful or unsuccessful, the completion indication of the RA procedure would not be transmitted to the triggering base station 200 in spite of failure of the RA procedure, which may prevent network resources from being efficiently utilized. The period configured for the timer may be a predetermined period and be indicated from the triggering base station 200 such as the master base station 200A, for example.

In one embodiment, the RA procedure activation event is additional configuration of a secondary cell, and if the RA procedure has not been completed before expiration of the timer, the RA processing unit 120 may stop all uplink transmissions in a secondary cell. Specifically, the RA processing unit 120 may stop the uplink transmissions by indicating MAC (Medium Access Control) reset to the transmission and reception unit 110.

In one embodiment, even upon exceeding the maximum number of retransmissions of a PRACH (Physical Random Access Channel), the RA processing unit 120 may continue in retransmitting the PRACH during activation of the timer. The maximum number of retransmissions of the PRACH is predetermined, but even if the number of retransmissions of the PRACH exceeds the maximum number of retransmissions, the RA processing unit 120 may continue in transmitting the PRACH during activation of the timer. For example, the RA processing unit 120 continues in transmitting an RA preamble to the secondary base station 200B, but if the RA processing unit 120 has failed to receive an RA response correspondingly, the RA processing unit 120 may continue in retransmitting the RA preamble during activation of the timer in spite of exceeding the maximum number of retransmissions.

In one embodiment, the timer management unit 130 may indicate to the triggering base station 200 in a MAC signal or an RRC signal that the RA procedure has not been completed. For example, if the RRC signal is used, the timer management unit 130 may indicate radio link failure (RLF) originating from expiration of the timer to the triggering base station 200.

In one embodiment, if the RA procedure activation event is simultaneous addition of multiple cell groups, the timer management unit 130 may configure specific timers for the RA procedures performed for the respective cell groups. For example, upon receiving an indication to additionally configure cell groups X and Y simultaneously, the RA processing unit 120 may perform the RA procedures X and Y for the respective secondary base stations 200X and 200Y serving the cell groups X and Y and activate the timer X for the cell group X and the timer Y for the cell group Y. In this case, the timer management unit 130 manages the timers X and Y separately depending on execution statuses of the RA procedures X and Y for the secondary base stations 200X and 200Y. For example, if the RA procedure X for the secondary base station 200X has been completed whereas the RA procedure Y for the secondary base station 200Y has not been completed, the timer management unit 130 stops and resets the timer X but continues in counting the timer Y. If the RA procedure Y has not been completed before expiration of the timer Y, the timer management unit 130 indicates the incompletion of the RA procedure Y to the master base station 200A.

In another embodiment, if the RA procedure activation event is simultaneous addition of multiple cell groups, the timer management unit 130 may configure a common timer for the RA procedures performed for the respective cell groups, and if any of the performed RA procedures has not been completed before expiration of the common timer, the timer management unit 130 may indicate incompletion of the RA procedure to the triggering base station 200 together with an identifier of the not-completed cell group.

In one embodiment, only if an indication to configure the timer is received from the triggering base station 200, the timer management unit 130 may activate the timer. Specifically, only if a timer configuration indication is detected together with the RA procedure activation event for the secondary base station 200B, the timer management unit 130 may activate the timer. In other words, even upon detection of the RA procedure activation event, the timer management unit 130 does not have to always activate the timer, and only if the timer configuration indication is received from the triggering base station 200, the timer management unit 130 may activate the timer. For example, the timer configuration may be indicated in a certain information element (IE) in an RRC.

Figure 6:
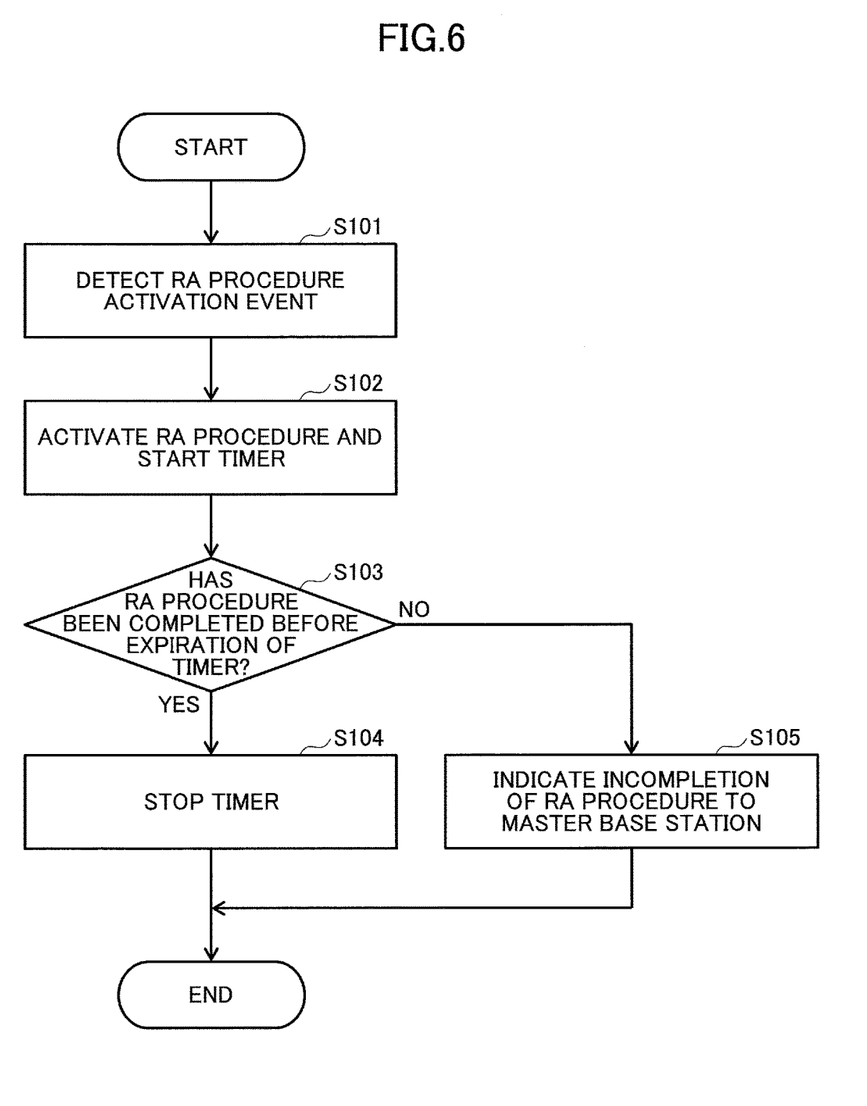
FIG. 6 is a flowchart for illustrating a random access operation in the user equipment according to one embodiment of the present invention.

Next, a random access operation in the user equipment according to one embodiment of the present invention is described with reference to FIG. 6. FIG. 6 is a flowchart for illustrating a random access operation according to one embodiment of the present invention.

As illustrated in FIG. 6, at step S101, the user equipment 100 detects an RA procedure activation event for triggering activation of the RA procedure for the secondary base station 200B. The RA procedure activation event may be various indications such as additional configuration of a secondary cell, modification of a special secondary cell where a PUCCH is configured (primary secondary cell), modification of security of a secondary cell, switching on and off TTI bundling in a secondary cell or the like. The additional configuration of a secondary cell may be indicated in an RRC connection reconfiguration, for example.

At step S102, the user equipment 100 performs the RA procedure and activates the timer. For example, if an RRC connection reconfiguration is received from the master base station 200A to indicate additional configuration of a secondary cell, the user equipment 100 performs the RA procedure for the secondary base station 200B, and after performing reconfiguration in accordance with the RRC connection reconfiguration, the user equipment 100 returns an RRC connection reconfiguration complete to the master base station 200A without waiting for completion of the RA procedure.

At step S103, the user equipment 100 determines whether the performed RA procedure has been completed before expiration of the timer. For example, in response to reception of an RA response, completion of a contention resolution or reception of an initial PDCCH, the user equipment 100 may determine that the RA procedure has been completed.

If the performed RA procedure has been completed before expiration of the timer (S103: YES), the user equipment 100 stops and resets the timer at step S104. Subsequently, the user equipment 100 communicates with the secondary base station 200B, with which connection has been established, in dual connectivity.

On the other hand, if the performed RA procedure has not been completed before expiration of the timer (S103: NO), the user equipment indicates to the master base station 200A that the RA procedure has not been completed at step S105. The indication may be transmitted in a MAC signal or an RRC signal. For example, if the RRC signal is used, the indication may be transmitted as radio link failure originating from expiration of the timer.

Although the embodiments of the present invention have been described in detail, the present invention is not limited to the above-stated specific embodiments, and various modifications and variations can be made within the spirit of the present invention as recited in claims.

This international patent application is based on Japanese Priority Application No. 2014-098136 filed on May 9, 2014, the entire contents of which are hereby incorporated by reference.

LIST OF REFERENCE SYMBOLS

10: radio communication system
100: user equipment
110: transmission and reception unit
120: random access (RA) processing unit
130: timer management unit

The invention claimed is:

1. User equipment having a dual connectivity function to communicate with a master base station and a secondary base station simultaneously, comprising:
    a transmission and reception unit configured to transmit and receive radio signals to/from the master base station and the secondary base station;
    an RA processing unit configured to perform a random access (RA) procedure; and
    a timer management unit configured to activate a timer upon detecting an RA procedure activation event for triggering activation of the RA procedure for the secondary base station,
    wherein a period configured for the timer is indicated from the master base station,
    wherein if the RA procedure performed in response to detection of the RA procedure activation event has not been completed before expiration of the timer, the timer management unit indicates to the triggering base station that the RA procedure has not been completed, and
    wherein even upon exceeding a maximum number of retransmissions of a PRACH (Physical Random Access Channel), the RA processing unit continues in retransmitting the PRACH during activation of the timer.

2. The user equipment as claimed in claim 1, wherein if the RA procedure has been completed before expiration of the timer, the timer management unit stops the timer.

3. The user equipment as claimed in claim 2, wherein the RA procedure activation event is additional configuration of a secondary cell, and if the RA procedure has not been completed before expiration of the timer, the RA processing unit stops all uplink transmissions in the secondary cell.

4. The user equipment as claimed in claim 2, wherein in response to reception of an RA response, completion of a contention resolution or reception of an initial PDCCH (Physical Downlink Control Channel), the timer management unit determines that the RA procedure has been completed.

5. The user equipment as claimed in claim 2, wherein the RA procedure activation event is simultaneous addition of multiple cell groups, and the timer management unit configures specific timers for the RA procedures performed for the respective cell groups.

6. The user equipment as claimed in claim 2, wherein the RA procedure activation event is simultaneous addition of multiple cell groups, and the timer management unit configures a common timer for the RA procedures performed for the respective cell groups, and if any of the performed RA procedures has not been completed before expiration of the common timer, the timer management unit indicates incompletion of the RA procedure to the triggering base station together with an identifier of the not-completed cell group.

7. The user equipment as claimed in claim 2, wherein the RA procedure activation event is an operation required to perform the RA procedure for the secondary base station.

8. The user equipment as claimed in claim 2, wherein only if an indication to configure the timer is received from the triggering base station, the timer management unit activates the timer.

9. The user equipment as claimed in claim 1, wherein the RA procedure activation event is additional configuration of a secondary cell, and if the RA procedure has not been completed before expiration of the timer, the RA processing unit stops all uplink transmissions in the secondary cell.

10. The user equipment as claimed in claim 9, wherein in response to reception of an RA response, completion of a contention resolution or reception of an initial PDCCH (Physical Downlink Control Channel), the timer management unit determines that the RA procedure has been completed.

11. The user equipment as claimed in claim 1, wherein in response to reception of an RA response, completion of a contention resolution or reception of an initial PDCCH (Physical Downlink Control Channel), the timer management unit determines that the RA procedure has been completed.

12. The user equipment as claimed in claim 1, wherein the RA procedure activation event is simultaneous addition of multiple cell groups, and the timer management unit configures specific timers for the RA procedures performed for the respective cell groups.

13. The user equipment as claimed in claim 1, wherein the RA procedure activation event is simultaneous addition of multiple cell groups, and the timer management unit configures a common timer for the RA procedures performed for the respective cell groups, and if any of the performed RA procedures has not been completed before expiration of the common timer, the timer management unit indicates incompletion of the RA procedure to the triggering base station together with an identifier of the not-completed cell group.

14. The user equipment as claimed in claim 1, wherein the RA procedure activation event is an operation required to perform the RA procedure for the secondary base station.

15. The user equipment as claimed in claim 1, wherein only if an indication to configure the timer is received from the triggering base station, the timer management unit activates the timer.

16. A method for performing a random access (RA) procedure in user equipment having a dual connectivity function to communicate with a master base station and a secondary base station simultaneously, comprising:
    detecting an RA procedure activation event to trigger activation of the RA procedure for the secondary base station;
    performing the RA procedure and activating a timer, wherein a period configured for the timer is indicated from the master base station;
    if the performed RA procedure has not been completed before expiration of the timer, indicating incompletion of the RA procedure to the triggering base station, and
    retransmitting a PRACH (Physical Random Access Channel) during activation of the timer even upon exceeding a maximum number of retransmissions of the PRACH.

* * * * *